(12) United States Patent
Usuda et al.

(10) Patent No.: US 8,804,626 B2
(45) Date of Patent: Aug. 12, 2014

(54) TRANSMISSION RATE CONTROL METHOD, MOBILE STATION, RADIO NETWORK CONTROLLER, AND RADIO BASE STATION

(75) Inventors: Masafumi Usuda, Yokosuka (JP); Anil Umesh, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 551 days.

(21) Appl. No.: 11/429,066

(22) Filed: May 8, 2006

(65) Prior Publication Data
US 2007/0002801 A1 Jan. 4, 2007

(30) Foreign Application Priority Data
May 10, 2005 (JP) .............. P2005-137917

(51) Int. Cl.
*H04W 4/00* (2009.01)
*H04W 28/22* (2009.01)
*H04L 1/18* (2006.01)
*H04L 1/00* (2006.01)
*H04L 1/16* (2006.01)

(52) U.S. Cl.
CPC ............. *H04W 28/22* (2013.01); *H04L 1/1812* (2013.01); *H04L 1/0002* (2013.01); *H04L 1/1822* (2013.01); *H04L 1/0028* (2013.01); *H04L 1/0025* (2013.01); *H04L 1/1825* (2013.01); *H04L 1/1671* (2013.01)
USPC ........... 370/329; 370/328; 370/335; 370/341; 370/342; 455/509; 455/522

(58) Field of Classification Search
USPC .................. 370/329, 335, 341, 342
See application file for complete search history.

(56) References Cited

U.S. PATENT DOCUMENTS

| | | | | |
|---|---|---|---|---|
| 7,522,526 | B2* | 4/2009 | Yi et al. | 370/236 |
| 7,924,770 | B2* | 4/2011 | Sebire et al. | 370/328 |
| 2004/0219943 | A1* | 11/2004 | Terry et al. | 455/522 |
| 2004/0266466 | A1* | 12/2004 | Kim et al. | 455/509 |
| 2005/0013263 | A1 | 1/2005 | Kim et al. | |
| 2005/0047344 | A1* | 3/2005 | Seol | 370/235 |
| 2005/0068921 | A1* | 3/2005 | Liu | 370/335 |
| 2005/0068990 | A1 | 3/2005 | Liu | |
| 2005/0073987 | A1* | 4/2005 | Wu | 370/349 |
| 2005/0207359 | A1* | 9/2005 | Hwang et al. | 370/278 |
| 2005/0237932 | A1* | 10/2005 | Liu | 370/230 |
| 2005/0249133 | A1* | 11/2005 | Terry et al. | 370/278 |
| 2005/0265301 | A1* | 12/2005 | Heo et al. | 370/349 |
| 2006/0013268 | A1* | 1/2006 | Terry | 370/537 |

(Continued)

OTHER PUBLICATIONS

Search report issued on Sep. 8, 2006 in the counterpart European application.

(Continued)

*Primary Examiner* — Liton Miah
(74) *Attorney, Agent, or Firm* — Marvin A. Motsenbocker; Mots Law, PLLC

(57) ABSTRACT

A transmission rate control method for controlling a transmission rate of uplink user data which is transmitted from a mobile station located in a predetermined cell to a radio base station, includes: notifying, from the radio base station to the mobile station, a transmission power offset of an Enhanced Dedicated Physical Data Channel to a Dedicated Physical Control Channel using a Common Absolute Grant transmission rate control signal which is transmitted through an E-DCH Absolute Grant Channel; transmitting, at the mobile station, the uplink user data based on the notified transmission power offset, at a determined portion of HARQ process after receiving the Common Absolute Grant transmission rate control signal.

3 Claims, 6 Drawing Sheets

(56) References Cited

U.S. PATENT DOCUMENTS

| | | | |
|---|---|---|---|
| 2006/0056360 A1* | 3/2006 | Parkvall et al. | 370/335 |
| 2006/0171307 A1* | 8/2006 | Gopalakrishnan et al. | 370/229 |
| 2006/0221885 A1* | 10/2006 | Nagaraj | 370/328 |
| 2007/0168827 A1* | 7/2007 | Lohr et al. | 714/749 |

OTHER PUBLICATIONS

Official Action Letter issued on Aug. 28, 2007 in the counterpart Korean Patent Application.

3GPP TS 25.309 V6.2.0 (Mar. 2005) 3rd Generation Partnership Project; Technical Specification Group Radio Access Network; FDD Enhanced Uplink; Overall description; Stage 2.

TSG-RAN WG2 #46bis, R2-050929,Beijing, China, Apr. 4-8, 2005 Source: Ericsson/ Title: Single mode scheduler—way forward/ Agenda Item: 11.2 (stage 2 open items 5.11 and 5.15).

Panasonic, "E-AGCH Signalling format," 3GPP TSG-RAN WG2#47 meeting, May 9-13, 2005, Athen, Greece, R2-051342, 6 pages.

Office communication of Mar. 1, 2011, issued in the counterpart European patent application.

Nokia: "Simple Per Process Scheduling", 3GPP Draft; R2-050XXX CR 25.309 Simple Per Process RRC, 3rd Generation Partnership Project (3GPP), Mobile Competence Centre; 650, Route Des Lucioles; F-06921 Sophia-Antipolis Cedex; France, vol. RAN WG2, no. Beijing, china; Mar. 30, 2005, XP050128219.

Fujitsu et al: "Simple Per Process Scheduling", 3GPP Draft; R2-050861 Simple Per Process Scheduling, 3rd Generation Partnership Project (3GPP), Mobile Competence Centre; 650, Route Des Lucioles; F-06921 Sophia-Antipolis Cedex; France, vol. RAN WG2, no. Beijing, china; Mar. 30, 2005, XP050128107.

European Office Action issued on May 22, 2012 in the counterpart European patent application.

\* cited by examiner

☒ TRANSMISSION DATA BLOCK OF MOBILE STATION A
☐ TRANSMISSION DATA BLOCK OF MOBILE STATION B

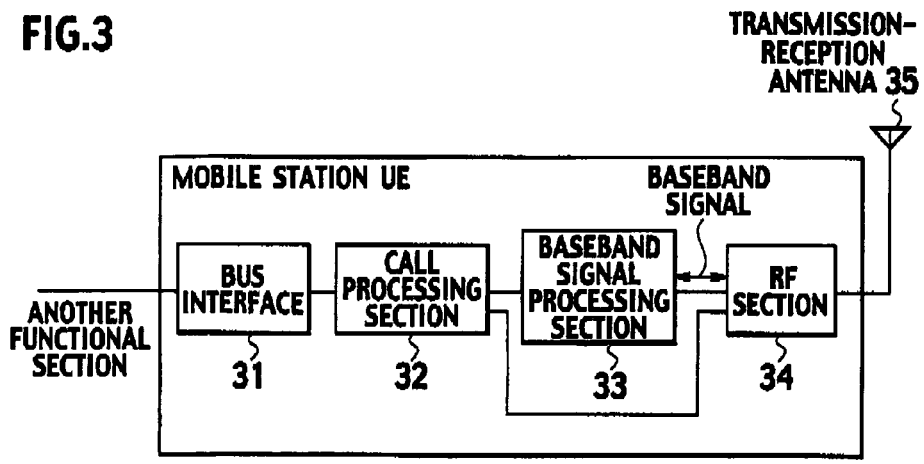
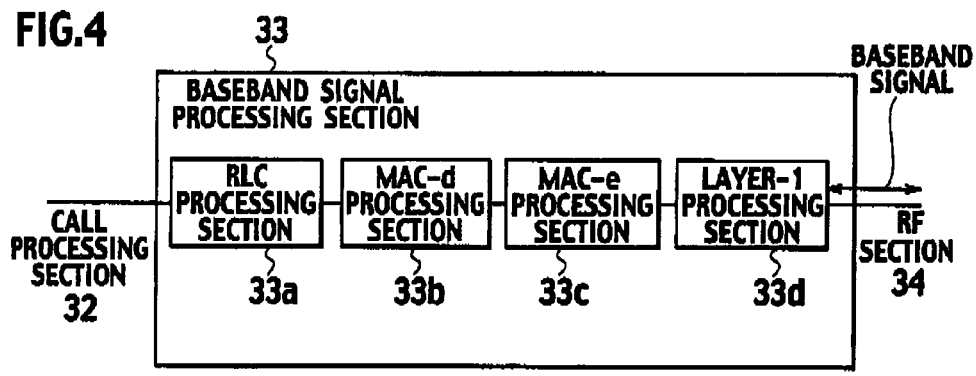
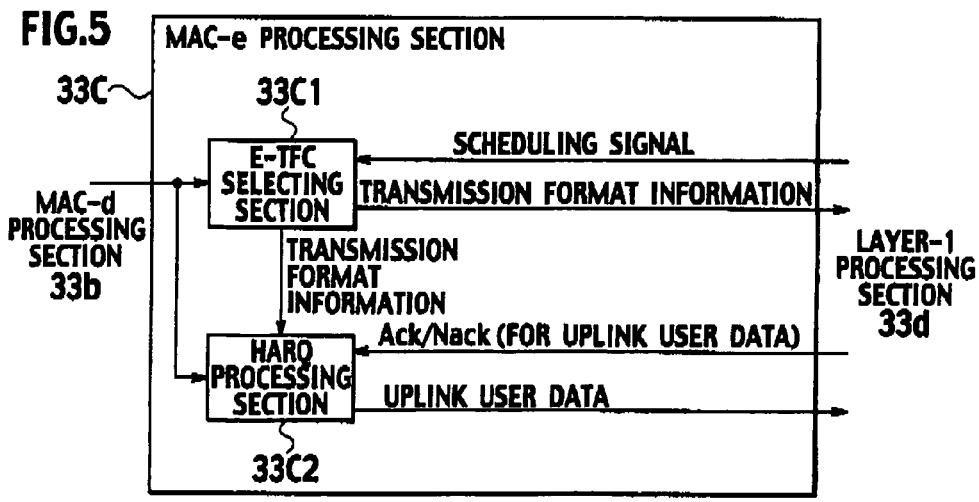

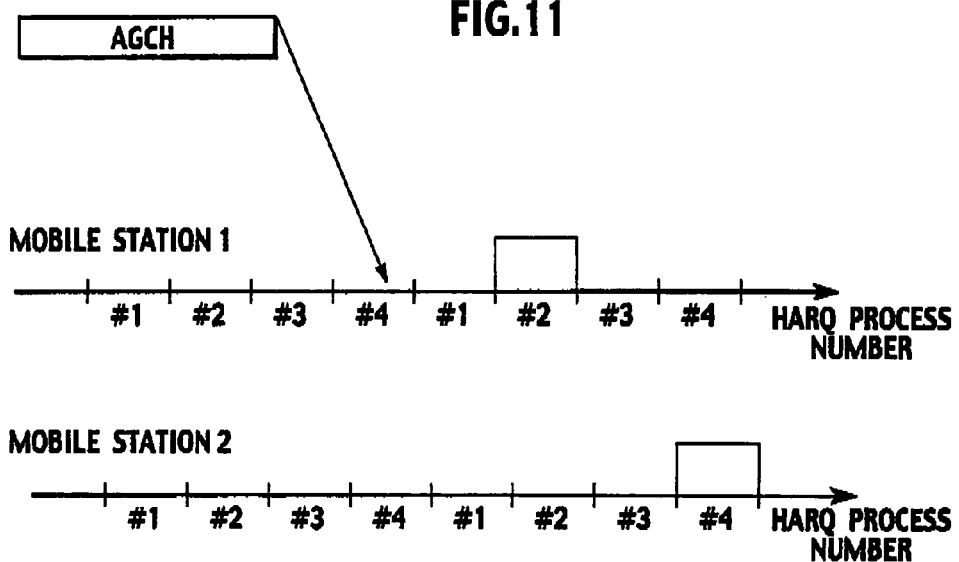

TRANSMISSION RATE CONTROL METHOD, MOBILE STATION, RADIO NETWORK CONTROLLER, AND RADIO BASE STATION

CROSS REFERENCES TO RELATED APPLICATION

This application is based upon and claims the benefit of priority from the prior Japanese Patent Application No. P2005-137917, filed on May 10, 2005; the entire contents of which are incorporated herein by reference.

BACKGROUND OF THE INVENTION

1. Field of the Invention

The present invention relates to a transmission rate control method, a mobile station, and a radio network controller.

2. Description of the Related Art

In a field of "Enhanced Uplink (EUL)", a transmission rate control method, which can perform both of a common transmission rate control and a dedicated transmission rate control by using two "Absolute Grant (AG)", is proposed.

One of the AG is a "Common Absolute Grant transmission rate control signal (Common Absolute Grant)" which is received at every mobile stations UE having the same ID (a common ID) located in the cell.

Other AG is a "Dedicated Absolute Grant transmission rate control signal (Dedicated Absolute Grant)" which is received at each mobile station having different ID respectively (See, Non-Patent Literature 1: 3GPP TSG-RAN R2-050929).

The AG is transmitted from a radio base station Node B to the mobile station UE through an "E-DCH AG Channel (E-AGCH)". Each of the Common AG and the Dedicated AG can be paired with the different E-AGCH respectively, or can be paired with the same E-AGCH.

On the other hand, as shown in Non-Patent Literature 2 (3GPP TSG-RAN TS25.309 v6.2.0), a Transmission Time Interval (herein after, TTI) of an "Enhanced Dedicated Channel (E-DCH)" can be selected from "2 ms" and "10 ms".

When the TTI is set to "2 ms", it is possible to perform a detailed scheduled transmission. When the TTI is set to "10 ms", it is possible to decrease an impact to downlink capacity by decreasing a downlink transmission power.

In other words, when the TTI of the E-DCH is set to "2 ms", a frame length of layer-1 channel (E-AGCH/E-RGCH/E-HICH) in downlink which relates to the EUL becomes "2 ms".

When the TTI of the E-DCH is set to "10 ms", a frame length of the E-AGCH which relates to the EUL becomes "10 ms", and a frame length of the E-RGCH and the E-HICH which relate to the EUL becomes "8 ms".

Therefore, when the TTI of the E-DCH is set to "10 ms", the frequency of transmitting the layer-1 channel in downlink which relates to the EUL is decreased, and it is possible to decrease the impact to downlink capacity.

As shown in Non-Patent Literature 2, the transmission rate control uses a method of designating, at a radio base station Node B, a transmission power offset (transmission power of Enhanced Dedicated Physical Data Channel/transmission power of Dedicated Physical Control Channel, i.e., a transmission power offset of the E-DPDCH to the DPCCH) to the mobile station using the AG, and determining, at the mobile station UE, a Transport Block Size (TBS) for transmitting uplink user data, based on a correspondence table associating the transmission power offset indicated by the received AG with the TBS.

However, when the E-DCH which has different TTI is controlled using the Common AG, the following problem can be occurred.

Here, an example of case that the TTI of the E-DCH are set to "2 ms" or "10 ms", the minimum TBS is set to 200 bits, and the transmission power offset which corresponds to 60 kbps is notified as a scheduling signal through the Common AG, will be studied.

In this situation, when the TTI of the E-DCH is set to "10 ms", the mobile station UE can transmit 600 bit (=60 kbps×10 ms) of uplink user data at each TTI (each HARQ process).

However, when the TTI of the E-DCH is set to "2 ms", an amount of user data which can be transmitted at each TTI (each HARQ process) is 120 bit (60 kbps×2 ms), and does not reach to the minimum TBS (200 bit). Accordingly, when the TTI of the E-DCH is set to "2 ms", the mobile station UE cannot transmit uplink user data at each TTI (each HARQ process).

In this situation, a method for transmitting the uplink user data by limiting HARQ processes to be used is conceivable.

For example, a method for transmitting the uplink user data, by limiting the HARQ process to be used to one HARQ process, and increasing a transmission power offset by "N" times ("N" indicated the maximum number of HARQ processes) is conceivable.

To be more specific, a method for transmitting, at the mobile station, the uplink user data with the transmission power offset increased by "N" times, at an HARQ process corresponding to a timing in which the Common AG has been received is conceivable.

However, in this situation, all of the mobile stations UE receive the Common AG at almost the same timing. Therefore, there is a problem that an interference power will be increased during a TTI of HRAQ process corresponding to the timing.

BRIEF SUMMARY OF THE INVENTION

The present invention has been made considering the problems, and its object is to provide a transmission rate control method, a mobile station, and a radio network controller, which can spread an interference power and increase a capacity of radio network, by starting transmission of uplink user data at a determined portion of HARQ process, after receiving the Common AG, at the mobile station.

A first aspect of the present invention is summarized as a transmission rate control method for controlling a transmission rate of uplink user data which is transmitted from a mobile station located in a predetermined cell to a radio base station, including: notifying, from the radio base station to the mobile station, a transmission power offset of an Enhanced Dedicated Physical Data Channel to a Dedicated Physical Control Channel using a Common Absolute Grant transmission rate control signal which is transmitted through an E-DCH Absolute Grant Channel, transmitting, at the mobile station, the uplink user data based on the notified transmission power offset, at a determined portion of HARQ process after receiving the Common Absolute Grant transmission rate control signal.

In the first aspect, the determined portion of HARQ process can be notified by a radio network controller.

A second aspect of the present invention is summarized as a mobile station which controls a transmission rate of uplink user data, including: a receiver section configured to receive a Common Absolute Grant transmission rate control signal which includes information relating to a transmission power offset of an Enhanced Dedicated Physical Data Channel to a Dedicated Physical Control Channel through an E-DCH Absolute Grant Channel transmitted from a radio base station to the mobile station located in a predetermined cell; a transmitter section configured to transmit the uplink user data based on the notified transmission power offset, at a determined portion of HARQ process after receiving the Common Absolute Grant transmission rate control signal.

In the second aspect, the determined portion of HARQ process can be notified by a radio network controller.

A third aspect of the present invention is summarized as a radio network controller used in a transmission rate control method for controlling a transmission rate of uplink user data which is transmitted from a mobile station located in a predetermined cell to a radio base station, including: a notifying section configured to notify a portion of HARQ process to the mobile station; and wherein the mobile station transmits the uplink user data based on a transmission power offset of an Enhanced Dedicated Physical Data Channel to a Dedicated Physical Control Channel, at the portion of HARQ process after receiving a Common Absolute Grant transmission rate control signal through an E-DCH Absolute Grant Channel transmitted from a radio base station.

BRIEF DESCRIPTION OF THE SEVERAL VIEWS OF THE DRAWINGS

FIG. 3 is a functional block diagram of a mobile station in the mobile communication system according to an embodiment of the present invention.

FIG. 4 is a functional block diagram of a baseband signal processing section of the mobile station in the mobile communication system according to the embodiment of the present invention.

FIG. 5 is a functional block diagram of a MAC-e processing section of the baseband signal processing section in the mobile station of the mobile communication system according to the embodiment of the present invention.

FIG. 11 is a diagram showing operations of the mobile communication system according to the embodiment of the present invention.

DETAILED DESCRIPTION OF THE INVENTION (Configuration of Mobile Communication System According to First Embodiment of the Present Invention)

Referring to FIGS. 3 to 10, a configuration of a mobile communication system according to a first embodiment of the present invention will be described.

Figure 1:
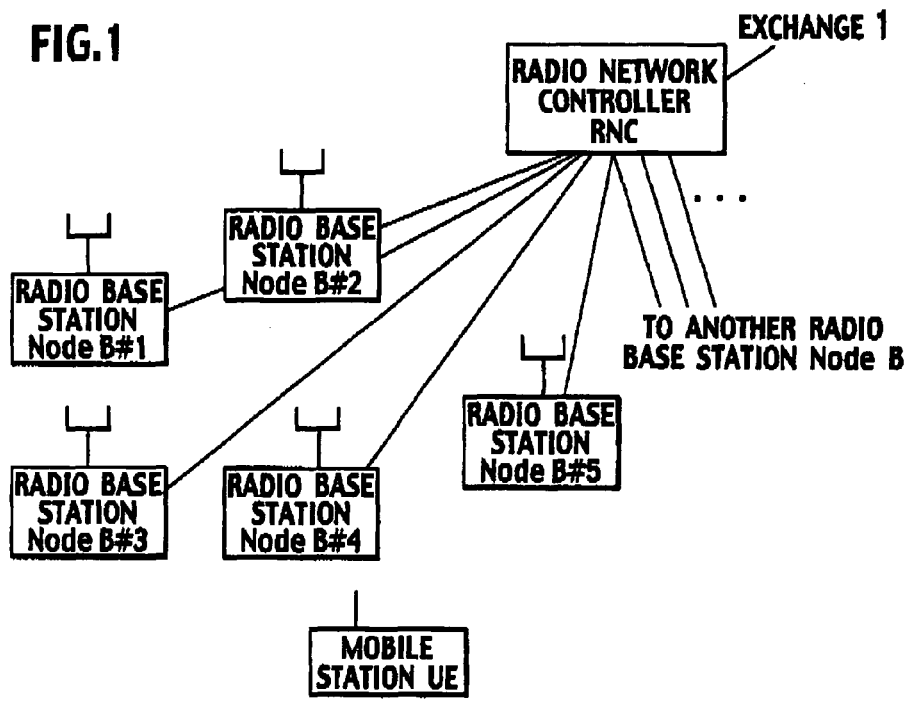
FIG. 1 is diagram of an entire configuration of a general mobile communication system.
Figure 2A:
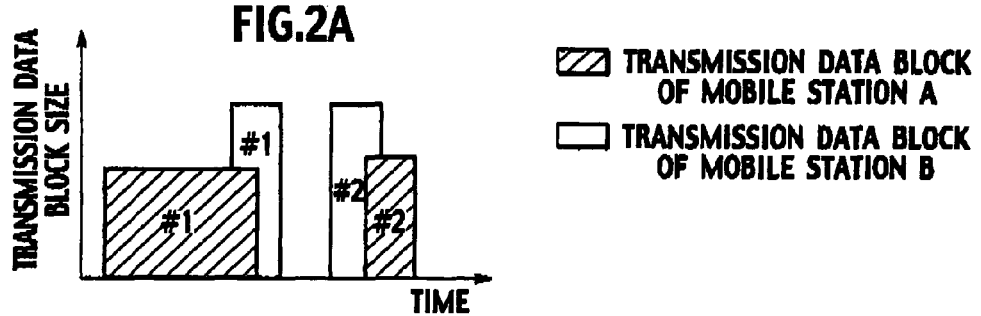
FIGS. 2A to 2C are graphs illustrating operations at the time of burst data transmission in a conventional mobile communication system.
Figure 2B:
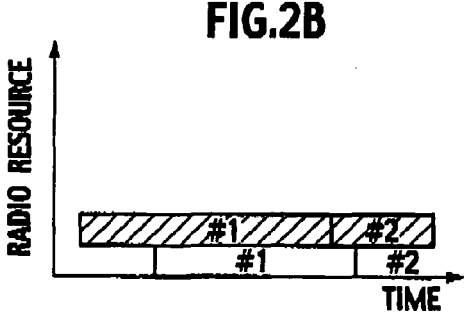
Figure 2C:
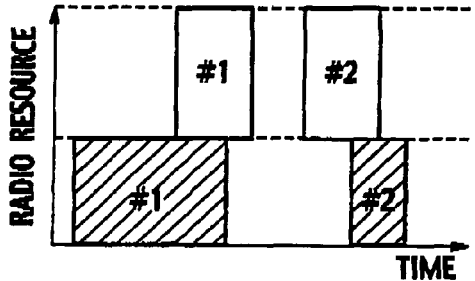

It should be noted that, as shown in FIG. 1, the mobile communication system according to this embodiment is provided with a plurality of radio base stations Node B #1 to Node B #5 and a radio network controller RNC.

The mobile station UE according to this embodiment is configured to control a transmission rate of uplink user data which is transmitted from the mobile station us located in a predetermined cell to the radio base station Node B.

The mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a transmission power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" which are needed when the HSPDA is applied, and a "Random Access Channel (RACH)", are also used.

The HS-DPCCH transmits a Channel Quality Indicator (CQI) in a downlink and an acknowledge signal (Ack or Nack) for the HS-DPCCH.

As shown in FIG. 3, the mobile station UE according to this embodiment is provided with a bus interface 31, a call processing section 32, a baseband processing section 33, a radio frequency (RP) section 34, and a transmission-reception antenna 35.

However, these functions can be independently present as hardware, and can be partly or entirely integrated, or can be configured through a process of software.

The bus interface 31 is configured to forward the user data output from the call processing section 32 to another functional section (for example, an application related functional section). In addition, the bus interface 31 is configured to forward the user data transmitted from another functional section (for example, the application related functional section) to the call processing section 32.

The call processing section 32 is configured to perform a call control processing for transmitting and receiving the user data.

The baseband signal processing section 33 is configured to transmit the user data to the call processing section 32, the user data acquired by performing, against the baseband signals transmitted from the RF section 34, a layer-1 processing including a despreading processing, a RAKE combining processing, and a "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

As shown in FIG. 4, the baseband signal processing section 33 is provided with a RLC processing section 33a, a MAC-d processing section 33b, a MAC-e processing section 33c, and a layer-1 processing section 33d.

The RLC processing section 33a is configured to transmit, to the MAC-d processing section 33b, the user data transmitted from the call processing section 32 by performing a processing (RLC processing) in an upper layer of a layer-2 against the user data.

The MAC-d processing section 33b is configured to grant a channel identifier header, and to create a transmission format in the uplink based on the limitation of transmission power.

As shown in FIG. 5, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH, based on scheduling signals (the AG, a Relative Grant (RG) and the like) transmitted from the radio base station Node B.

In addition, the E-TFC selecting section 33c1 is configured to transmit transmission format information on the determined transmission format (that is, a transmission data block size, an transmission power ratio between the E-DPDCH and the DPCCH, or the like) to the layer-1 processing section 33d, and also to transmit the determined transmission format information to the HARQ processing section 33c2.

Such a scheduling signal is information that is signaled in the cell where the mobile station UE is located, and includes control information for all the mobile stations located in the cell, or a specific group of the mobile stations located in the cell.

In addition, the E-TFC selecting section 33c1 is configured to transmit the uplink user data based on the notified transmission power offset, at a determined portion of HARQ process after receiving the Common Absolute Grant transmission rate control signal The HARQ processing section 33c2 is configured to perform process control for the "N-process stop-and-wait", so as to transmit, at each HARQ process, the user data in the uplink (uplink user data) based on an acknowledge signal (Ack/Nack for uplink data) transmitted from the radio base station Node B and the transmission format information determined by the E-TFC selecting section 33c1.

Figure 6:
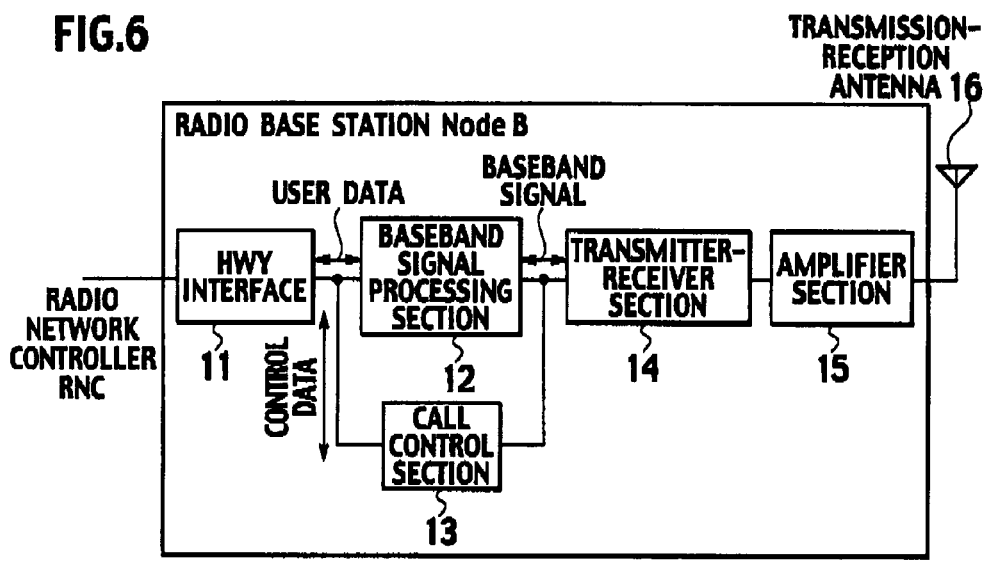
FIG. 6 is a functional block diagram of a radio base station of the mobile communication system according to the embodiment of the present invention.

As shown in FIG. 6, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are received from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the MAC-e processing and/or the layer-1 processing against the user data acquired from the HWY interface 11, so as to forward the generated baseband signals to the transmitter-receiver section 14.

Here, the MAC-e processing in the downlink includes an HARQ processing, a scheduling processing, a transmission rate control processing, or the like.

In addition, the layer-1 processing in the downlink includes a channel coding processing of user data, a spreading processing, or the like.

In addition, the baseband signal processing section 12 is configured to extract user data by performing the layer-1 processing and/or the MAC-e processing against the baseband signals acquired from the transmitter-receiver section 14, so as to forward the extracted user data to the HWY interface 11.

Here, the MAC-E processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

In addition, the call control section 13 is configured to perform call control processing based on the control data acquired from the HWY interface 11.

The transmitter-receiver section 14 is configured to perform processing of converting baseband signals, which are acquired from the baseband signal processing section 12, to radio frequency signals (downlink signals), so as to transmit the radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission-reception antenna 16, so as to transmit the amplified uplink signals to the transmitter-receiver section 14.

Figure 7:
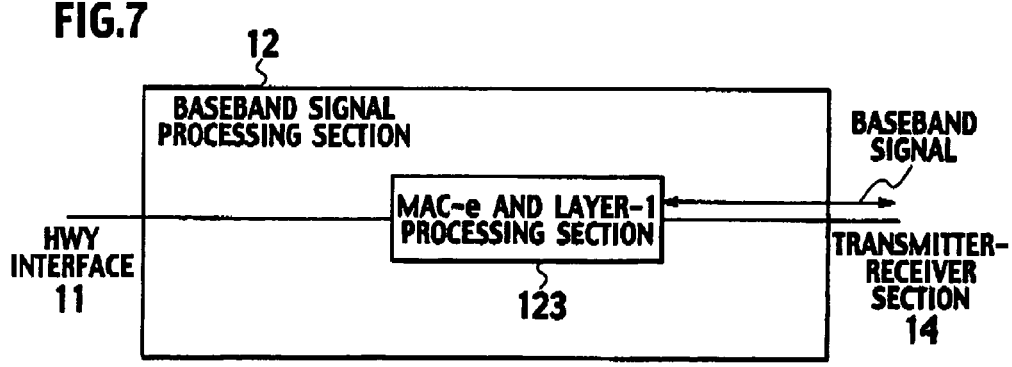
FIG. 7 is a functional block diagram of a baseband processing section in the radio base station of the mobile communication system according to the embodiment of the present invention.

As shown in FIG. 7, the baseband signal processing section 12 is provided with a MAC-e and layer-1 processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

However, these functions are not clearly divided per hardware, and can be obtained by software.

Figure 8:
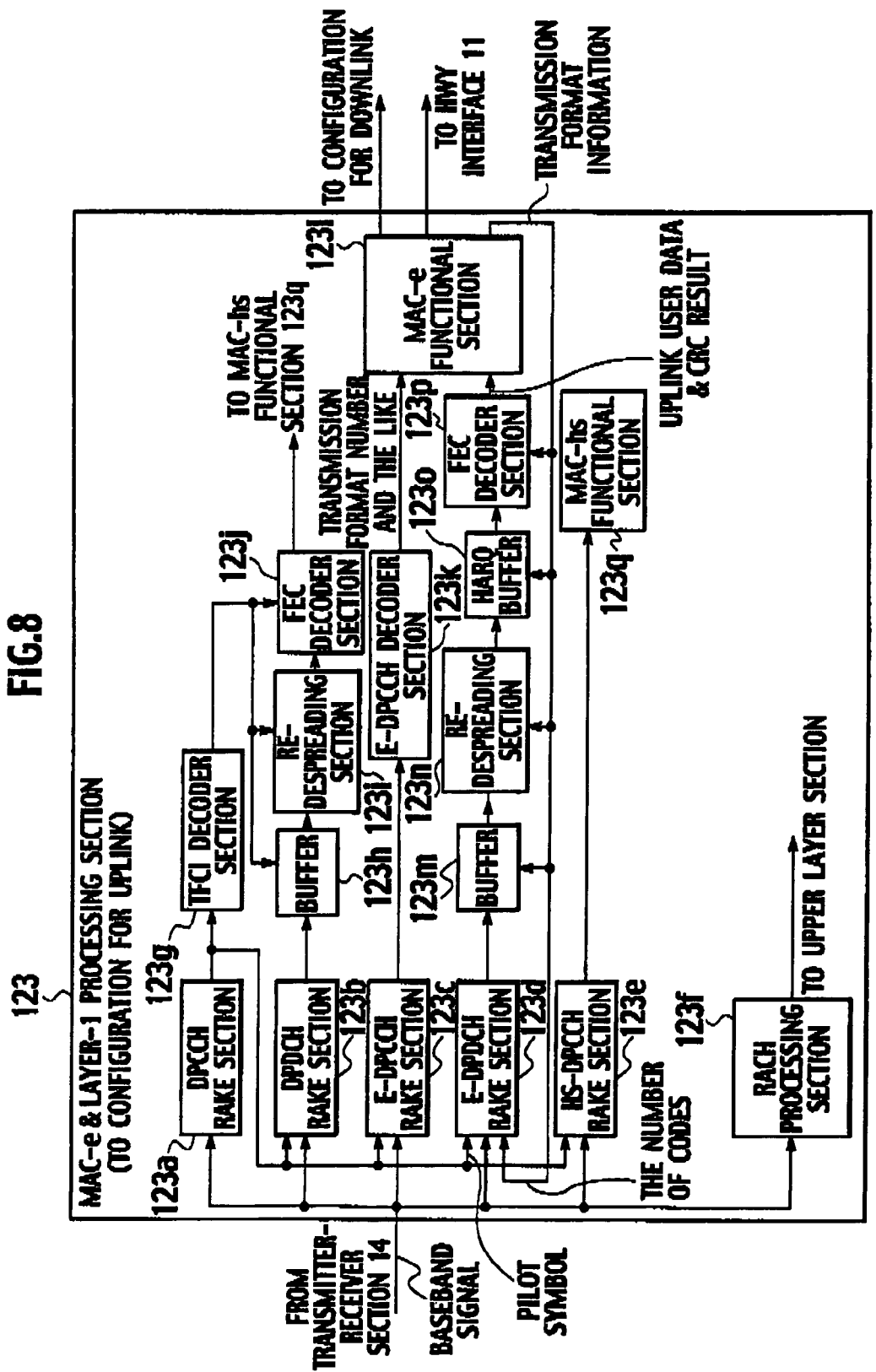
FIG. 8 is a functional block diagram of a MAC-e and layer-1 processing section (configured for an uplink) in the baseband signal processing section in the radio base station of the communication system according to the embodiment of the present invention.

As shown in FIG. 8, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, a RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, and a MAC-hs functional section 123q.

The E-DPCCH RAKE section 123c is configured to perform, against the E-DPCCH in the baseband signals transmitted from the transmitter-receiver section 14, the despreading processing and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the information to the MAC-e functional section 123l.

The E-DPDCH RAKE section 123d is configured to perform, against the E-DPDCH in the baseband signals transmitted from the transmitter-receiver section 14, the despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPDCH RAKE section 123d stored in the buffer 123m, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decoding processing (the FEC decode processing) against the despreading processing outputs of the re-despreading section 123n, which is stored in the HARQ buffer 123o, based on the transmission format information (transmission data block size) transmitted from the MAC-e functional section 123l.

The MAC-e functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

Figure 9:
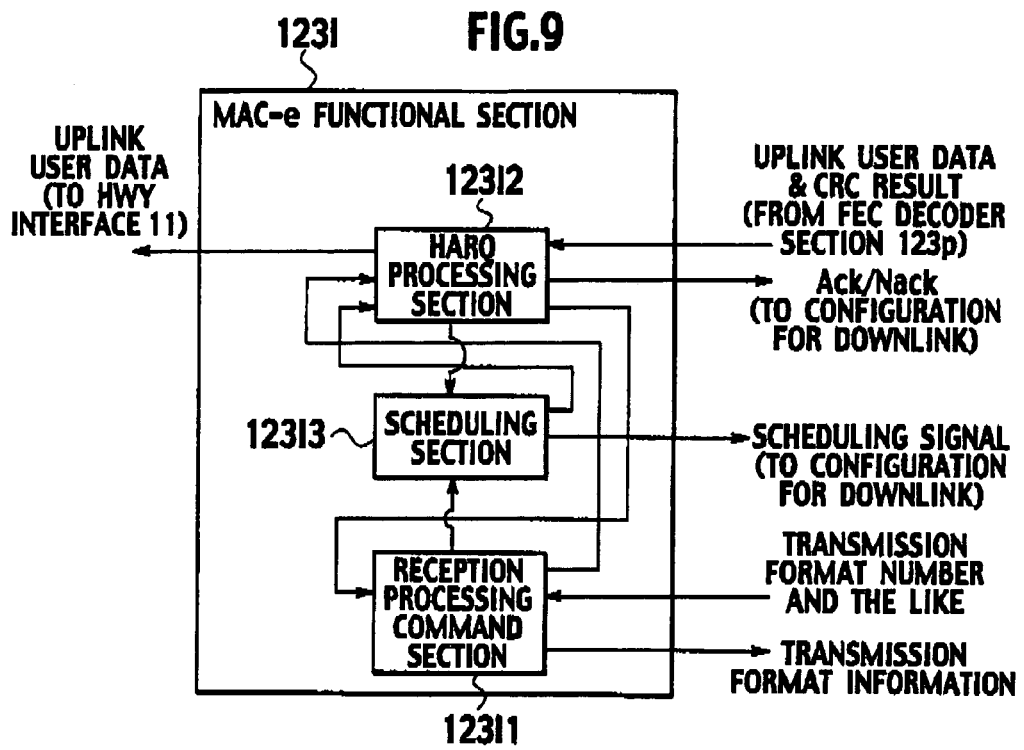
FIG. 9 is a functional block diagram of the MAC-e functional section of the MAC-e and layer-1 processing section (configured for the uplink) in the baseband signal processing section in the radio base station of the mobile communication system according to the embodiment of the present invention.

In addition, as shown in FIG. 9, the MAC-e functional section 123l is provided with a receive processing command section 123l1, an HARQ controlling section 123l2, and a scheduling section 123l3.

The receive processing command section 123l1 is configured to transmit the transmission format number related information, the HARQ related information, and the scheduling related information, which are entered from the E-DPCCH decoder section 123k, to the HARQ controlling section 123l2.

In addition, the receive processing command section 123l1 is configured to transmit, to the scheduling section 123l3, the scheduling related information entered from the E-DPCCH decoder 123k.

Further, the receive processing command section 123l1 is configured to output the transmission format information corresponding to the transmission format number entered from the E-DPCCH decoder section 123k.

The HARQ controlling section 123l2 is configured to determine whether or not the receive processing of uplink user data has been successful, based on the result of CRC entered from the FEC decoder section 123p.

Then, the HARQ controlling section 123l2 is configured to generate an acknowledge signal (Ack or Nack), based on the determination result, so as to transmit the generated acknowledge signal to the configuration for the downlink of the baseband signal processing section 12.

In addition, the HARQ controlling section 123l2 is configured to transmit the uplink user data entered from the FEC decoder section 123p to the radio network controller RNC, when the above determination result has been successful.

In addition, the HARQ controlling section 123l2 is configured to clear soft decision values stored in the HARQ buffer 123o, when the above determination result has been successful.

On the other hand, the HARQ controlling section 123l2 is configured to store, in the HARQ buffer 123o, the uplink user data, when the above determination result has not been successful.

In addition, the HARQ controlling section 123l2 is configured to forward the above determination result to the receive processing command section 123l1.

The receive processing control command section 123l1 is configured to notify the E-DPDCH RAKE section 123d and the buffer 123m of an hardware resource that should be prepared for the following transmission time interval (TTI) based on the determination result, so as to perform notification for reserving the resource in the HARQ buffer 123o.

In addition, when the uplink user data is stored in the buffer 123m, the receive processing command section 123l1 is configured to designate the HARQ buffer 123o and the FEC decoder section 123p to perform the FEC decode processing after adding the uplink user data, which is stored in the HARQ buffer 123o, in a process corresponding to the TTI and a newly received uplink user data, per TTI.

The scheduling section 123/3 is configured to transmit the scheduling signals (the RGCH, and the like) via the configuration for the downlink.

The scheduling section 123/3 can be configured to notify, to the mobile station UE, a transmission power offset of an Enhanced Dedicated Physical Data Channel (E-DPDCH) to a Dedicated Physical Control Channel (DPCCH) using a Common Absolute Grant transmission rate control signal which is transmitted through an E-DCH Absolute Grant Channel (E-AGCH).

The radio network controller RNC according to this embodiment is an apparatus provided at an upper level of the radio base station Node B, and is configured to control a radio communication between the radio base station Node B and the mobile station UE.

Figure 10:
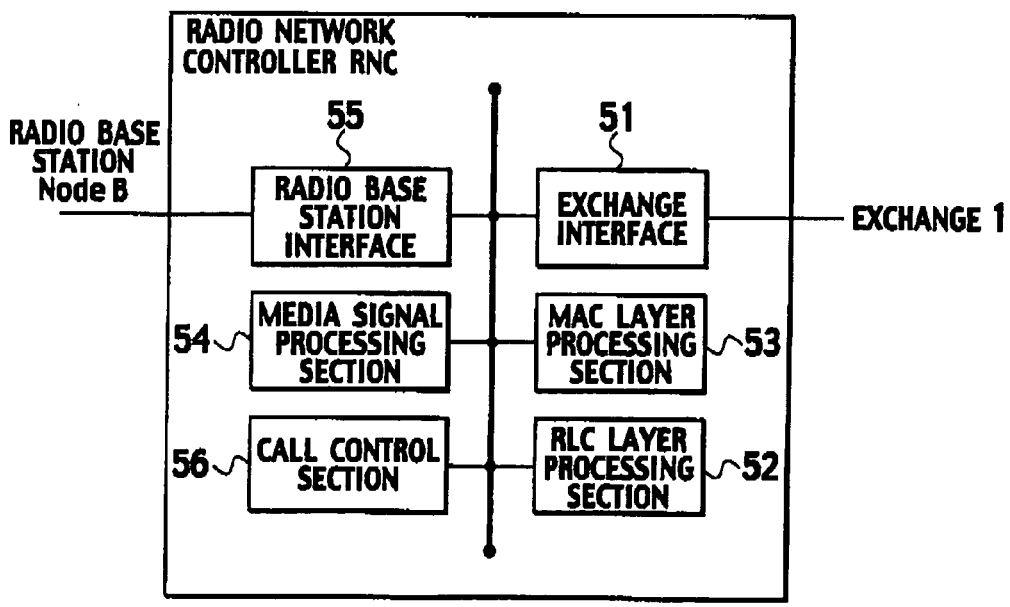
FIG. 10 is a functional block diagram of a radio network controller of the mobile communication system according to the embodiment of the present invention.

As shown in FIG. 10, the radio network controller RNC according to this embodiment is provided with an exchange interface 51, a Radio Link Control (RLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the RLC layer processing section 52, and to forward the uplink signals transmitted from the RLC layer processing section 52 to the exchange 1.

The RLC layer processing section 52 is configured to perform an RLC sub-layer processing such as a combining processing of a header such as a sequence number or a trailer.

The RLC layer processing section 52 is also configured to transmit the uplink signals to the exchange interface 51 and to transmit the downlink signals to the MAC layer processing section 53, after the RLC sub-layer processing is performed.

The MAC layer processing section 53 is configured to perform a MAC layer processing such as a priority control processing or a header granting processing.

The MAC layer processing section 53 is also configured to transmit the uplink signals to the RLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing for controlling radio resources such as call admission control processing, handover processing, and the like, a channel setup by the layer-3 signaling, and open processing, or the like.

The call control section 56 is configured to notify a portion of HARQ process (an initial value of HARQ process) to the mobile station.

Here, the mobile station UE transmits the uplink user data based on a transmission power offset of an Enhanced Dedicated Physical Data Channel to a Dedicated Physical control Channel, at the portion of HARQ process (at an HARQ process of the notified initial value of HARQ process) after receiving a Common Absolute Grant transmission rate control signal through an E-DCH Absolute Grant Channel transmitted from a radio base station.

In FIG. 11, an example for using a HARQ process at the mobile station UE according to this embodiment of the present invention is shown.

As shown in FIG. 11, the mobile station UE1 is configured to not to perform a transmission of the uplink user data as soon as the AGCH is received, but to perform the transmission of the uplink user data at the HARQ process #2, because the mobile station UE1 is notified to set the initial value of HARQ process as #2 from the radio network controller RNC.

In the same way, the mobile station UE2 is configured to wait to perform the transmission of the uplink user data until the HARQ process #4 even when the AGCH is received, because the mobile station UE2 is notified to start the transmission of the uplink user data at HARQ process #4 by the radio network controller RNC.

(Effects of Mobile Communication System According to First Embodiment of the Present Invention)

The present invention can provide a transmission rate control method, a mobile station, and a radio network controller, which can spread an interference power and increase a capacity of radio network, by starting transmission of uplink user data at a determined portion of HARQ process, after receiving the Common AG, at the mobile station.

Modified Example 1

In a mobile communication system according to a Modified Example 1, in stead the radio network controller RNC is configure to notify the initial value of HARQ process to the mobile station UE, the radio base station Node B is configure to notify the initial value of HARQ process to the mobile station UE.

Here, the initial value of HARQ process is a HARQ process number of HARQ process at which the mobile station UE starts transmission of the uplink user data after receiving the Common AG.

The radio base station Node B is configured to the initial value of HARQ process to the mobile station UE, through the DPDCH, DPCCH, AGCH and the like.

The initial value of HARQ process can be set to the radio base station Node B using an operation & maintenance terminal, and the initial value of HARQ process can be set to the radio base station Node B as a system value to be set in the radio base station Node B.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling a transmission rate of uplink user data which is transmitted from a mobile station located in a predetermined cell to a radio base station, comprising:
   notifying, from the radio base station to the mobile station, a transmission power offset of an enhanced dedicated physical data channel to a dedicated physical control channel using an absolute grant transmission rate control signal which is transmitted through an absolute grant channel;

transmitting, at the mobile station, the uplink user data based on the notified transmission power offset, at a determined HARQ process value from a set of HARQ processes after receiving the absolute grant transmission rate control signal, the determined HARQ process value being for transmitting data of which the transmission rate is controlled based on the absolute grant transmission rate control signal from the radio base station; and wherein the determined HARQ process value is determined by a radio network controller from the set of HARQ processes and is notified from the radio network controller.

2. A mobile station which controls a transmission rate of uplink user data, comprising:

a receiver section configured to receive an absolute grant transmission rate control signal which includes information relating to a transmission power offset of an enhanced dedicated physical data channel to a dedicated physical control channel through an absolute grant channel transmitted from a radio base station to the mobile station located in a predetermined cell;

a transmitter section configured to transmit the uplink user data based on the notified transmission power offset, at a determined HARQ process value from a set of HARQ processes after receiving the absolute grant transmission rate control signal, the determined HARQ process value being for transmitting data of which the transmission rate is controlled based on the absolute grant transmission rate control signal from the radio base station; and wherein the determined HARQ process value is determined by a radio network controller from the set of HARQ processes and is notified from the radio network controller.

3. A radio network controller used in a transmission rate control method for controlling a transmission rate of uplink user data which is transmitted from a mobile station located in a predetermined cell to a radio base station, comprising:

a notifying section configured to determine a HARQ process value from a set of HARQ processes, and notify a determined HARQ process value to the mobile station; and wherein the mobile station transmits the uplink user data based on a transmission power offset of an enhanced dedicated physical data channel to a dedicated physical control channel, at the determined HARQ process value after receiving an absolute grant transmission rate control signal through an absolute grant channel transmitted from a radio base station, wherein the determined HARQ process value is for transmitting data of which the transmission rate is controlled based on the absolute grant transmission rate control signal from the radio base station.

* * * * *